United States Patent
Kuster (10) Patent No.: US 8,564,880 B2
(45) Date of Patent: Oct. 22, 2013

(54) ZOOM SYSTEM FOR A MICROSCOPE AND METHOD OF OPERATING SUCH A ZOOM SYSTEM

(75) Inventor: Manfred Kuster, Widnau (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 356 days.

(21) Appl. No.: 13/043,813

(22) Filed: Mar. 9, 2011

(65) Prior Publication Data

US 2011/0222146 A1    Sep. 15, 2011

(30) Foreign Application Priority Data

Mar. 10, 2010   (DE) .......................... 10 2010 002 722

(51) Int. Cl.
G02B 21/00   (2006.01)
G02B 9/00    (2006.01)
G02B 27/00   (2006.01)

(52) U.S. Cl.
CPC ............ *G02B 27/0075* (2013.01); *G02B 21/00* (2013.01)
USPC .............................. 359/383; 359/368; 359/738

(58) Field of Classification Search
USPC .................................. 359/368–390, 738–740
See application file for complete search history.

(56) References Cited

U.S. PATENT DOCUMENTS

| | | | |
|---|---|---|---|
| 3,360,327 A | 12/1967 | Rosenberger et al. | |
| 3,876,289 A | 4/1975 | DeVeer et al. | |
| 6,142,988 A | 11/2000 | Strähle et al. | |
| 6,212,005 B1 * | 4/2001 | Kawasaki et al. | 359/388 |
| 6,292,306 B1 * | 9/2001 | Betensky | 359/663 |
| 6,717,739 B2 | 4/2004 | Zimmer et al. | |
| 6,807,014 B2 | 10/2004 | Kawasaki | |
| 6,816,321 B2 | 11/2004 | Zimmer et al. | |
| 6,888,673 B2 * | 5/2005 | Reynolds | 359/368 |
| 7,605,975 B2 | 10/2009 | Zimmer et al. | |
| 2005/0168809 A1 * | 8/2005 | Moller et al. | 359/368 |
| 2006/0114554 A1 * | 6/2006 | Suzuki et al. | 359/380 |
| 2013/0188025 A1 * | 7/2013 | Hayashi | 348/49 |

* cited by examiner

*Primary Examiner* — Thong Nguyen
(74) *Attorney, Agent, or Firm* — Hodgson Russ LLP (57) ABSTRACT

The present invention relates to an afocal zoom system for a microscope with a shutter for controlling the depth of focus of the microscopic image produced by an object, wherein at least one shutter is disposed in front of the first lens group of the zoom system, viewed from the object, in the direction of the beam path passing through the zoom system, and/or at least one shutter is disposed on a lens group of the zoom system, the diameter of which can be varied in order to control the depth of focus, without causing vignetting of the edge beams.

8 Claims, 5 Drawing Sheets

PRIOR ART

Fig. 1

PRIOR ART

Fig. 2

PRIOR ART

ZOOM SYSTEM FOR A MICROSCOPE AND METHOD OF OPERATING SUCH A ZOOM SYSTEM

FIELD OF THE INVENTION

The present invention relates to a zoom system, particularly an afocal zoom system, for a microscope, particularly an operating microscope, and an (operating) microscope of this kind, and a method of operating such a zoom system.

BACKGROUND OF THE INVENTION

Zoom systems for microscopes, particularly for operating microscopes or high performance stereomicroscopes, are known in a number of forms from the prior art. For example, U.S. Pat. No. 6,816,321 discloses an afocal zoom system for high performance stereomicroscopes with which zoom factors z (ratio of maximum to minimum zoom magnification) of more than 15 can be achieved. Besides optional add-on modules, stereomicroscopes of this type comprise a main objective which images the object towards infinity, two parallel refractors downstream thereof, for varying the magnification, and two eyepiece units (binocular tubes) comprising a tube lens, a reversing system and an eyepiece for optical viewing with both eyes. The refractors may be in the form of Galileo refractors for stepwise selection of the magnification or as afocal zoom systems for continuously selecting the magnification. The distance of the refractor axis is termed the stereo base. The numerical aperture of this microscope is half the diameter of the entrance pupil of the telescope or refractor divided by the focal length of the main objective.

German patent DE 102 25 192 B4 relates to an objective for stereomicroscopes of the telescope type and a corresponding stereomicroscope. For details of its construction and mode of operation and the relation between magnification, resolution and vignetting, reference is made expressly to the above patent.

A high powered stereomicroscope with enhanced resolution and at the same time increased depth of focus for the same size of stereomicroscope is known from German patent DE 10 2006 036 300 B4. The embodiments in conjunction with FIGS. 9 and 10 in the specification of that document describe the construction and mode of operation of the afocal zoom systems used for the high powered stereomicroscope described therein. To this extent, reference is made specifically to this specification. Additionally, the afocal zoom systems referred to are also described in U.S. Pat. No. 6,816,321 mentioned previously (corresponding to DE 102 22 041 B4). FIG. 1 of the specification of DE 10 2006 036 300 B4 shows two parallel afocal zoom systems of a stereomicroscope in which an (iris) shutter or (iris) diaphragm with an adjustable diameter is arranged within the zoom system. The diameters are adjusted to be the same for both zoom systems. The iris shutters limit the corresponding diameters of the entrance pupils which are variably large, depending on the zoom setting and choice of shutter, but are the same on both sides.

Figure 1:
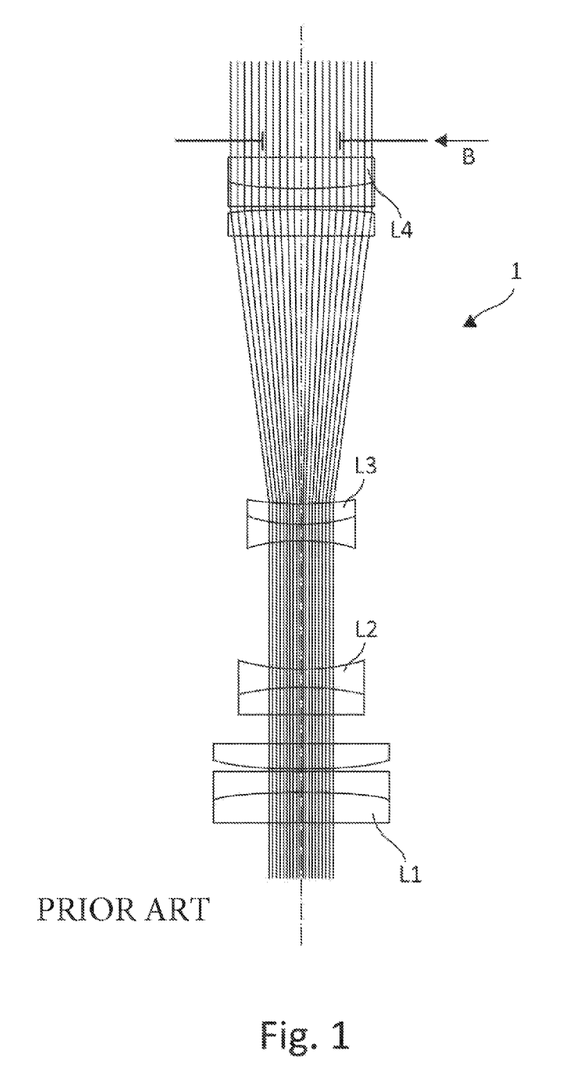
FIG. 1 shows a zoom system according to the prior art with the pencil of light of the imaging beam path for low zoom magnifications.
Figure 2:
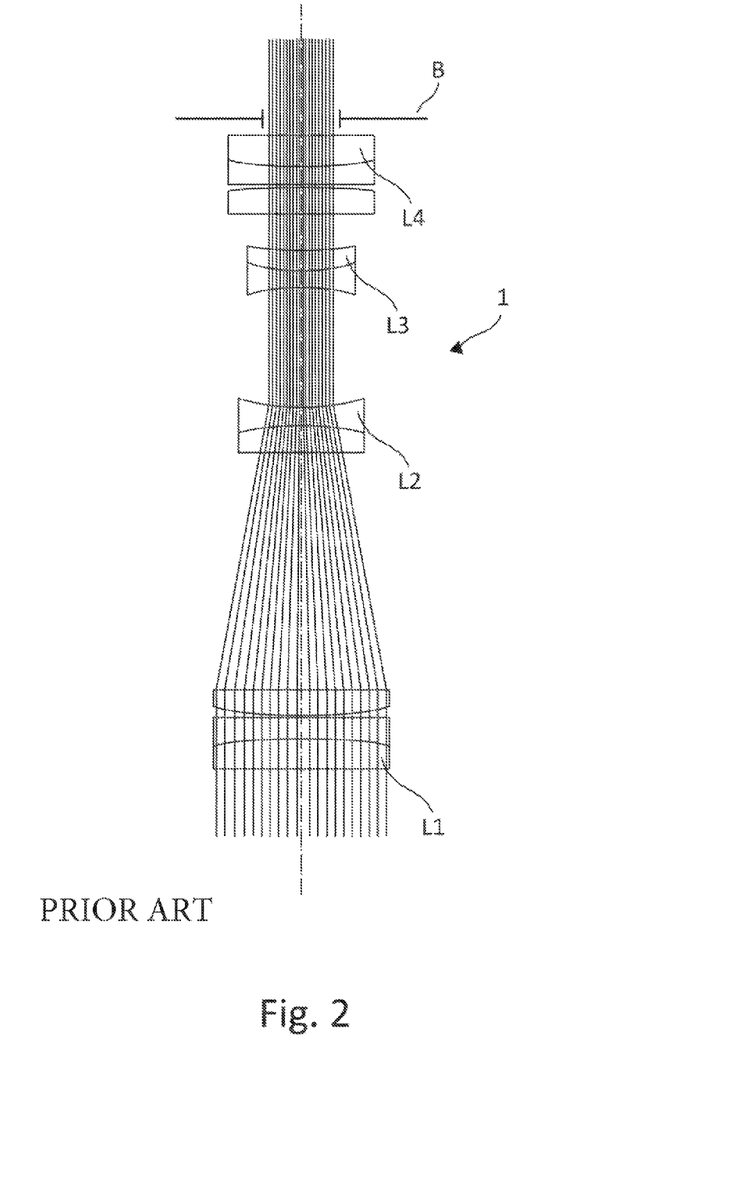
FIG. 2 shows a zoom system according to the prior art with a pencil of light of the imaging beam path for high zoom magnifications.

In another type of zoom system, an (aperture) shutter or (aperture) diaphragm is positioned after the last lens component in the direction of light flow. A corresponding system is schematically shown in FIGS. 1 and 2 of this application. The zoom system here is designated 1 and has four lens components or groups L1, L2, L3 and L4, the two outer lens components L1 and L4 being fixed, while the two inner lens components L2 and L3 are arranged to be axially moveable (along the optical axis). The movement of the lens components L2 and L3 takes place along precisely prescribed pathways and passes from a setting for low magnifications (FIG. 1) to a setting for high magnifications (FIG. 2). The shutter (or diaphragm) arranged after the zoom system 1 in the direction of propagation of the beam is designated B.

FIGS. 1 and 2 of this application show that the shutter (or diaphragm) B is effective at low magnifications while it has little or no effect at high magnifications. The shutter B thus influences the numerical aperture and hence also the depth of focus and brightness only for low to medium magnifications, while the depth of focus at high magnifications, in particular, cannot be increased. Further closing of the shutter B results in strong vignetting for the edge regions of the object field. On the other hand, at low magnification, the depth of focus is great in any case, so that a further increase in the depth of focus using the shutter B is scarcely necessary in practice. Further remarks on this zoom system 1 and on zoom systems in general can be found in the "Selected Papers on Zoom Lenses", published by Allen Mann, SPIE Milestone Series, Volume MS 85.

SUMMARY OF THE INVENTION

An object underlying the present invention is therefore to provide a zoom system in which the depth of focus can be influenced, if possible without the disadvantages described above, even at high magnifications.

The afocal zoom system according to the invention for a microscope, particularly an operating microscope, comprises a shutter (or diaphragm) for controlling the depth of focus of the microscopic image generated from an object. At least one shutter is fixedly disposed in front of the first lens group of the zoom system, viewed from the object, in the direction of the beam path passing through the zoom system, and/or at least one shutter is disposed on a lens group of the zoom system the diameter of which can be varied in order to control the depth of focus. The first lens group of the zoom system, viewed from the object, is the first lens group of the zoom system struck by the imaging beam path.

The invention further relates to a microscope, particularly an operating microscope, with an afocal zoom system according to the invention as described above for imaging an object with a variable depth of focus. Microscopes of this kind, particularly stereomicroscopes and operating microscopes, are known per se in their construction and mode of operation (cf. the prior art mentioned in the introduction to the description). Stereomicroscopes of the telescope type have a main objective common to both beam paths, adjoining which in the axial directions are two zoom systems. These are in turn connected to two eyepiece units, each comprising tube lenses which generate immediate images, and symmetrical reversing systems for rectifying the image, and finally two eyepieces. In this case the user perceives the three-dimensional image of the object directly with his eyes. Optionally, in known manner, additional assemblies may be provided in the beam path, such as for example lens attachments, filters, polarisers, illuminating units, beam splitter systems for coupling in and out of light, etc.

The invention further relates to a method of operating an afocal zoom system according to the invention for imaging an object by means of a microscope, particularly an operating microscope, the zoom system having a first shutter and a second shutter, the first shutter being arranged in front of the first lens group of the zoom system, in the direction of the beam path passing through the zoom system, viewed from the object, and the second shutter being arranged after the last lens group of the zoom system, and the depth of focus of the image being controlled by varying the shutter diameter of the second shutter, for small to medium magnifications of the zoom system, and by varying the shutter diameter of the first shutter, for medium to high magnifications of the zoom system. Thus, using the method according to the invention, it is possible to adjust the depth of focus over the entire range of magnifications of the zoom system without at the same time getting strong vignetting for the edge regions of the object field during the transition to high magnifications. Regarding the mode of operation of this method reference should be made to the above remarks in connection with the zoom system according to the invention, particularly the embodiment with a first, front, and second, rear, shutter.

The invention is illustrated by an embodiment shown schematically in the drawings and is described in detail hereinafter with reference to the drawings.

BRIEF DESCRIPTION OF THE DRAWINGS

Further preferred embodiments are indicated in the subclaims and will be described below in more detail with reference to the drawings, in which:

DETAILED DESCRIPTION OF THE INVENTION

The zoom system according to the invention is thus characterised first of all in that, by contrast with the known zoom systems, the shutter for controlling the depth of focus is not arranged after the lens groups of the zoom system, in the direction of the imaging beam path, but in front of it. Because of the already relatively high depth of focus at low zoom magnifications, the influence of the "rear" shutter, i.e. the shutter known from the prior art, on the depth of focus tends to be slight. Moreover, this rear shutter loses effect at high zoom magnifications or leads to strong vignetting in this case. If on the other hand instead of the known rear shutter the front stationary of fixed shutter according to the invention is used, i.e. a shutter arranged in front of the first lens group of the zoom system on the light entry side, this may cut the pencil of rays (pencil of light) equally on the entrance side, in the range of medium to high zoom magnifications (cf also FIG. 2) and thus increase the depth of focus without producing vignetting for the edge regions of the object field. The fixed front shutter used according to the invention, in fact, uniformly cuts a pencil of light from the centre of the object and a pencil of light from a point on the edge of the object. These pencils of light have the same diameter and the same position, in fact, at the site of the first lens group, whereas at the site of the last lens group they still have the same diameter but are offset from one another. Meanwhile, the front shutter shows little effect in the range from small to medium zoom magnifications, which is of no consequence in practice because of the depth of focus being higher in this range in any case.

It is particularly advantageous if the said shutter is constructed as an iris shutter (iris diaphragm). The shutter acts in a similar manner to an aperture shutter, i.e. it increases the depth of focus as the shutter diameter becomes smaller, while it increases the resolution of the image and its brightness as the shutter diameter increases.

It is particularly advantageous if the front shutter is arranged immediately in front of the first lens group of the zoom system, the term "immediately" referring to an area which begins in the axial direction at the outermost apex of the first lens group on the beam entry side and advantageously extends at most to half the diameter of this first lens group in the axial direction.

In an advantageous embodiment, a further (second) shutter is fixedly arranged in the direction of the beam path passing through the zoom system, after the last lens group of the zoom system, viewed from the object, i.e. at the exit end of the imaging beam path of the zoom system itself. This additional shutter corresponds to the "rear" shutter as known from the prior art. This rear shutter is, in particular, also arranged immediately after the last lens group, the term "immediately" referring to an area which begins at the outermost apex of the last lens group of the zoom system on the beam exit side and advantageously extends in the axial direction to half the diameter of this last lens group.

Whereas the first, front shutter is used primarily to regulate or adjust the depth of focus in the range from medium to high zoom magnifications, the second, rear shutter may be used to regulate or adjust the depth of focus and/or brightness at low to medium zoom magnifications.

This arrangement makes it possible to carry out a method described hereinafter for operating the zoom system according to the invention.

In another aspect of the invention, alternatively or additionally, at least one shutter is arranged on a lens group of the zoom system, the diameter of which can be varied in order to control the depth of focus. A shutter of this kind is, in particular, an opto-electronic element such as an LCD (liquid crystal display). Particularly suitable are elements of this kind in film form which can be applied directly to a lens group of the zoom system, whilst it should also be understood that elements of this kind may be applied to individual lenses of a lens group.

In another advantageous embodiment of this second aspect of the invention the said shutter may be mounted in particular on a moveable lens group of the zoom system. In a zoom system the site of the aperture varies depending on the zoom magnification selected. The magnification of the zoom is set by a defined movement of at least one lens group of the zoom system, so that mounting the shutter on a suitable moveable lens group may have the effect of ensuring that the shutter is always as close as possible to the site of the aperture.

The shutter proposed according to the second aspect of the invention and mounted on a lens group of the zoom system may in particular replace the front and/or rear shutter described according to the first aspect of the invention: for example, instead of the front shutter (according to the first aspect) a shutter (according to the second aspect) may be provided on the first lens group of the zoom system. Conversely, instead of the rear shutter (according to the first aspect) a shutter (according to the second aspect) may be mounted on the last lens group of the zoom system. Furthermore, in a four-component zoom system, for example, instead of a front shutter (according to the first aspect), a shutter (according to the second aspect) may be mounted on the second lens group of the zoom system and/or instead of the rear shutter (according to the first aspect) a shutter (according to the second aspect) may be mounted on the third (penultimate) lens group of the zoom system. Further permutations of the above combinations are possible and will be apparent to the skilled man without departing from the scope of the present invention. These permutations are to be regarded as having been expressly disclosed without each individual permutation requiring detailed explanation.

In one particular embodiment of the method according to the invention, the said shutters may optimally be used to control brightness and depth of focus while zooming through the range of magnifications of the zoom system: for this purpose, during the transition from small to high zoom magnifications, for example, the shutter diameter of the second, rear, shutter is increased such that the brightness of the imaging remains as constant as possible. As it is known that the brightness of an image decreases as the zoom magnification increases, this effect can thus be compensated by having the diameter of the second, rear, shutter increased accordingly. On the other hand, during the transition from low to high magnifications of the zoom system, the shutter diameter of the first, front, shutter may be reduced in size so that the sharp reduction in the depth of focus is mitigated. As the depth of focus of the image decreases sharply as the zoom magnification increases, this effect can thus be attenuated by reducing the size of the shutter diameter of the first, front, shutter accordingly.

As in this embodiment a change in the shutter diameter of the first, front, shutter also affects the brightness of the image and conversely a change in the shutter diameter of the second, rear, shutter also affects the depth of focus of the image, it is expedient to use a software-based control or regulating method in order that, for example, the brightness be kept as constant as possible over the entire zoom range.

It makes sense to adopt the following values for the terms "low," "medium," and "high magnification" (magnification factor): The range for low magnification is from 0% to 25%, the range for medium magnification is from 25% to 75% and the range for high magnification is from 75% to 100% of the maximum zoom magnification that can be achieved.

For the method according to the invention as described, regarding the alternative or additional use of a shutter mounted on a lens group, the remarks made above in connection with the zoom system according to the invention also apply. To avoid repetition, reference is made thereto. In particular, in this method, the first shutter (front shutter according to the first aspect of the invention) may be replaced by a shutter which is mounted on the first lens group of the zoom system or (more advantageously) on a movable lens group of the zoom system located behind it. In another embodiment it is also possible to replace the second shutter (rear shutter according to the first aspect of the invention) by a shutter according to the second aspect of the invention. The latter shutter is mounted in particular on the last lens group of the zoom system or (more preferably) on a movable lens group of the system located in front of it. With regard to the procedure used in the method and possible options and advantages arising therefrom, reference is made specifically to the earlier comments.

It will be understood that the features mentioned above and those about to be described hereinafter may be used not only in the particular combination specified, but also in other combinations or on their own, without departing from the scope of the present invention.

FIG. 1 shows, in a highly schematic view, a zoom system 1 of the kind known from the prior art cited in the introduction to the description. The zoom system 1 consists of four lens groups L1 to L4, the two outer lens groups L1 and L4 being fixed and the two inner lens groups L2 and L3 being arranged so as to be axially movable. Whereas FIG. 1 shows a setting of the inner lens groups L2 and L3 for low magnifications, FIG. 2 shows a setting for high magnifications. Each lens group L1, L2, L3, L4 consists of a plurality of individual lenses which may be cemented together. Since, in the arrangement of the lens groups L1 to L4 shown and in view of the fact that they have to be moved, an (aperture) shutter or diaphragm can only be fitted by increasing the construction volume and/or by reducing the zoom range that can be achieved, it is common to place a shutter B, which is usually in the form of an iris shutter, behind the last lens group L4 in the direction of beam propagation.

As shown in FIG. 1, at low magnifications the shutter B has the effect of limiting the pencil of light emerging from the last lens group L4. Because of the high depth of focus that is already present at low magnifications, however, this measure tends to affect the brightness and the resolution of the image rather than the depth of focus.

As is apparent from FIG. 2, at high magnifications the shutter B does not affect the diameter of the pencil of light emerging from the last lens group L4 for the axis point and object points close to the axis. It is indeed possible to reduce the diameter of the shutter B still further, at high magnifications, in order to increase the depth of focus, but because of the strong vignetting for the edge beams (cf. FIG. 3) this involves a considerable loss of quality of the image.

Figure 3:
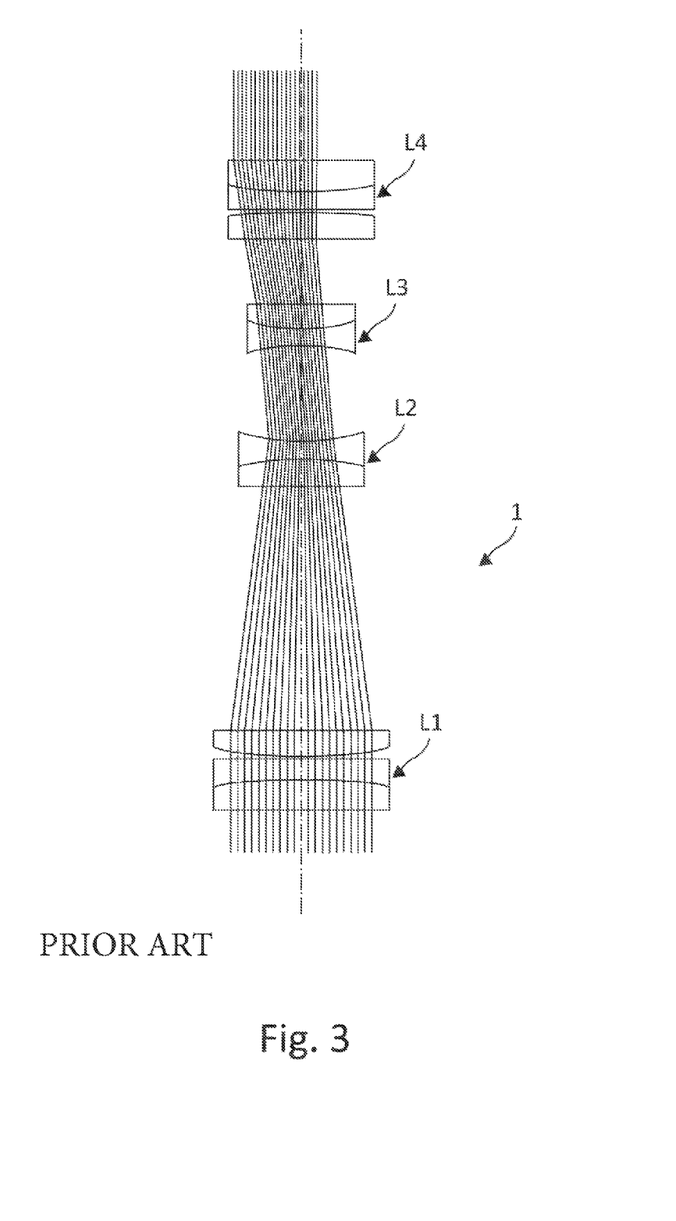
FIG. 3 shows a zoom system according to the prior art with a pencil of light of an edge beam in medium to high zoom magnifications.

FIG. 3 shows a known afocal zoom system 1 with four lens groups L1 to L4 with the beam pencil of an edge beam, i.e. an object point remote from the axis. The beams entering the zoom system 1 and the beams leaving the zoom system 1 are all parallel to one another (afocal zoom system). A comparison of FIG. 3 with FIG. 2 clearly shows that the pencil of light of an edge beam is offset on the exit side of the zoom system 1 relative to the pencil of light for the axis point. This explains the previously mentioned strong vignetting for the edge beams when a shutter is provided on the exit side of the zoom system 1.

Figure 4:
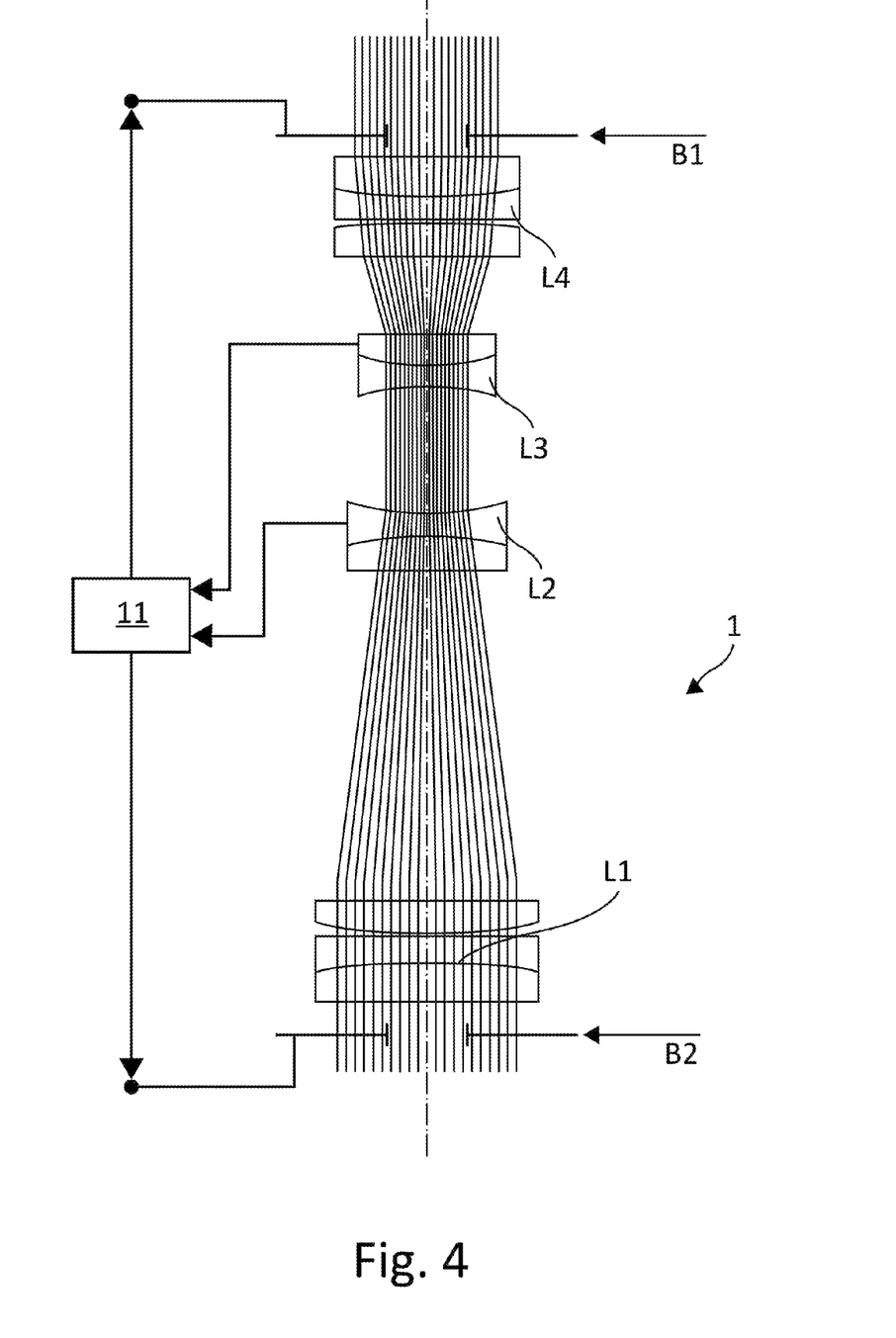
FIG. 4 shows an embodiment of a zoom system according to the invention with a pencil of light of the imaging beam path for medium to high magnifications.

FIG. 4 shows, starting from the zoom system according to FIGS. 1 and 2, a particularly preferred embodiment of a zoom system. Here, a first, fixed front shutter B2 is arranged in front of the first lens group L1 of the zoom system 1. Moreover, a second, fixed rear shutter B1 is arranged behind the last lens group L4.

First of all, the mode of operation of the first, front shutter B2 will be discussed. For this purpose, the shutter B1 can be regarded as not being there. At the medium to high magnification of the zoom system 1 shown, the shutter B2 leads to a uniform cutting of the pencil of light entering the zoom system, i.e. both the pencil of light from the centre of the object and that of the edge beam (cf. FIG. 3). A reduction in the shutter diameter of the shutter B2 thus leads to an increase in the depth of focus, without causing vignetting for the edge regions of the object field. With regard to the situation at low to medium magnification, it can be stated, with reference to FIG. 1, that the shutter B2 has little influence because of the reduced cross-section of the pencil of light in the direction of low magnification. As already mentioned several times, however, this is of no significance in practice, as there is in any case a high depth of focus in this magnification range.

Particular possibilities are opened up by combining the first, front shutter B2 with the rear shutter B1, already discussed with reference to FIGS. 1 and 2, which is also referred to here as the second shutter B1. With an arrangement of this kind, the depth of focus and the brightness can be optimally adjusted while at the same time vignetting is kept to a minimum over the entire zoom range. The second, rear shutter B1 may be used to adjust the optimum brightness, in particular at low to medium zoom magnifications, while for medium to high zoom magnifications the first, front shutter B2 should be used for optimum adjustment of the depth of focus.

The adjustment of the two shutters B1 and B2 may be matched to one another in particular so that, during a transition from low to high zoom magnification, the brightness of the image is essentially kept constant by the fact that the diameter of the second, rear shutter B1 is enlarged. The optimum selection of the depth of focus can then be carried out by adjusting the shutter B2, the latter being reduced in diameter to keep the depth of focus constant during the transition from a low to a high zoom magnification. As a reduction in the diameter of the shutter B2 also affects the brightness of the image, this effect has to be taken into consideration when correspondingly adjusting the shutter B1 to keep the brightness constant. Obviously, the reverse also applies, as a change to the shutter B1 results in an effect, however small, on the depth of focus, which is what is supposed to be controlled primarily by the shutter B1 in this embodiment.

With the arrangement of the two shutters B1 and B2 shown in FIG. 4, a software-based control or regulation can be carried out particularly to adjust the brightness and depth of focus in the imaging of an object using a microscope having a zoom system 1 as shown in FIG. 4. A control unit 11 is preferably used which records the respective positions of the movable lens groups L2 and L3 as its input variables. The respective positions of these lens groups L2 and L3 are a measurement of the zoom magnification selected. Depending on this, the control unit 11 delivers output variables for adjusting the shutters B1 and B2 in their respective diameters.

Although FIG. 4 shows only an embodiment according to the first aspect of the invention, the skilled man, with his knowledge gained from the description of the invention according to the second aspect, will easily be able to replace one of the shutters B1 or B2 or both shutters B1 and B2 with the corresponding shutter or shutters according to the second aspect of the invention. No detailed description will be provided at this point, in the interests of conciseness.

Figure 5:
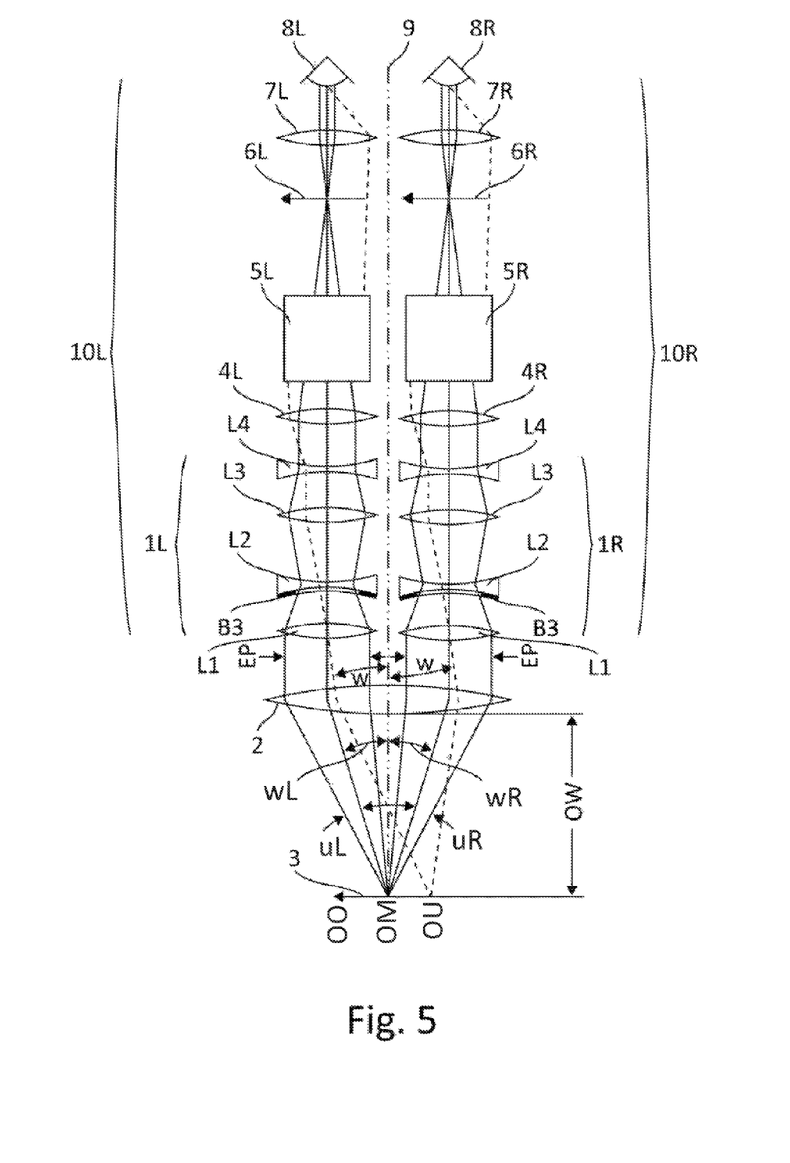
FIG. 5 diagrammatically shows a stereomicroscope with a zoom system in an embodiment according to the invention.

FIG. 5 schematically shows a stereomicroscope having a zoom system according to an embodiment of the invention. The stereomicroscope of the telescope type enables the viewer, whose eyes are designated 8R and 8L, to obtain a three-dimensional impression of the object 3 being viewed. For this purpose, the object 3, which is located in the front focal point of the objective 2, is imaged through two separate optical channels. The two viewing channels 10L and 10R are of similar construction and each contain a zoom system 1L, 1R, a tube lens 4L, 4R and an eyepiece 7L, 7R. Image reversal systems 5L, 5R arranged behind the tube lenses 4L and 4R provide intermediate images 6L, 6R that are the right way up, which are viewed visually using the pair of identical eyepieces. The pairs of optical elements mentioned above are arranged parallel and symmetrically with respect to the axis 9 of the objective 2. The two zoom systems 1L, 1R selectively change the magnification, but in the same way for the left- and right-hand channels 10L, 10R.

The two intermediate images 6L and 6R are different images of the object 3, as the object 3 is viewed in the left-hand channel 10L at the angle wL and in the right-hand channel 10R at the angle wR. In this way it is possible to achieve a stereoscopic view of the object 3.

The axis point of the object 3 is designated OM, while points remote from the axis are designated OU or OO, from which edge beams proceed (cf. FIG. 3). EP denotes the diameter of the entrance pupil of the zoom systems 1L, 1R. The references uL and uR denote the half-angles of opening of the cone with its vertex in the centre of the object OM, which is bounded by the entrance pupil.

At the maximum magnification of the zoom systems 1L, 1R, the entrance pupil diameter EP is at its maximum (cf. FIG. 2) and is then designated ENP. The object width, i.e. the spacing of the object 3 from the first surface of the objective 2, is designated OW. The field angle W shown in FIG. 5 turns out to be comparatively large, as a result of the object width OW which is chosen here to be small. Further explanations of the stereomicroscope shown can be found in DE 102 25 192 B4.

In FIG. 5, each of the zoom systems 1R and 1L is made up of the same four lens groups L1, L2, L3 and L4. According to the second aspect of the invention described, an opto-electronic shutter B3 is mounted on the second lens group L2. The shutter B3 is thus located on a movable lens group and is thus better able to take over the function of an aperture shutter. As already described in connection with FIG. 4, it is advantageous to provide another shutter towards the beam exit end, i.e. in this instance another shutter in the direction of the beam exit end of the zoom systems 1L and 1R. This additional shutter may also be an opto-electronic shutter which is preferably mounted on the lens group L3 or on the lens group L4. Finally, a conventional shutter may also be arranged immediately after the lens group L4 (cf. B1 in FIG. 4).

Instead of the electro-optical shutter B3 shown, which is mounted on the lens group L2, each of the zoom systems 1R and 1L may be replaced by a zoom system shown in FIG. 4. By this means, also, a microscope is obtained, particularly an operating microscope, with which it is possible to control the brightness and/or depth of focus of the image, as described. For controlling the shutters of the respective zoom systems 1L and 1R, a single control unit 11 is sufficient, which controls the corresponding shutters jointly, and moreover the position of the movable lens groups of a zoom system (1L or 1R) are sufficient as input signals for the control unit 11, as the two zoom systems 1L, 1R must always have the same zoom magnification.

LIST OF REFERENCE NUMERALS 1, 1R, 1L Zoom system
2 Objective
3 Object
4R, 4L Tube lens
5R, 5L Image reversal system
6R, 6L Intermediate image
7R, 7L Eyepiece
8R, 8L Eye
9 Axis of the objective
10R, 10L Viewing channel
11 Control unit
B Shutter
B1 Second shutter
B2 First shutter
B3 Opto-electronic shutter
EP Diameter of the entrance pupil
L1-L4 Lens groups
OM, OU, OO Object point
OW Width of object
uR, uL Half-angles of opening
W Field angle
wR, wL Observation angles

What is claimed is:
1. An afocal zoom system for a microscope comprising:
a plurality of lens groups including a first lens group disposed in the direction of a beam path passing through the zoom system from an object; and a first shutter having a variable diameter opening for controlling a depth of focus of a microscopic image of the object, wherein the first shutter is fixedly disposed in front of the first lens group or is disposed on a lens group in the plurality of lens groups;

wherein the plurality of lens groups includes a last lens group disposed in the direction of the beam path passing through the zoom system from the object, and the afocal zoom system further comprises a second shutter arranged after the last lens group;

wherein the second shutter is configured to be varied to control a depth of focus of the image of the object at low to medium magnifications of the afocal zoom system; and wherein the first shutter is configured to be varied to control the depth of focus of the image of the object at medium to high magnifications of the afocal zoom system.

2. The afocal zoom system according to claim 1, wherein the first shutter is arranged immediately in front of the first lens group.

3. The afocal zoom system according to claim 1, wherein the plurality of lens groups includes a movable lens group, and the first shutter is mounted on the movable lens group.

4. The afocal zoom system according to claim 3, wherein the first shutter is an opto-electronic shutter.

5. The afocal zoom according to claim 1, wherein the second shutter is arranged immediately after the last lens group.

6. A microscope comprising an afocal zoom system, the afocal zoom system having a plurality of lens groups including a first lens group disposed in the direction of a beam path passing through the zoom system from an object and a first shutter having a variable diameter opening for controlling a depth of focus of a microscopic image of the object, wherein the first shutter is fixedly disposed in front of the first lens group or is disposed on a lens group in the plurality of lens groups, whereby the depth of focus of the microscopic image is adjustable as a function of a selected magnification of the zoom system, wherein the plurality of lens groups includes a last lens group disposed in the direction of the beam path passing through the zoom system from the object, and the afocal zoom system further comprises a second shutter arranged after the last lens group, wherein the second shutter is configured to be varied to control a depth of focus of the image of the object at low to medium magnifications of the afocal zoom system, wherein the first shutter is configured to be varied to control the depth of focus of the image of the object at medium to high magnifications of the afocal zoom system.

7. A method of operating an afocal zoom system of a microscope for imaging an object, the afocal zoom system having a plurality of lens groups including a first lens group disposed in the direction of a beam path passing through the zoom system from an object, a last lens group through which the beam path passes, a first shutter fixedly disposed in front of the first lens group or disposed on a lens group in the plurality of lens groups wherein the first shutter has a variable diameter opening, and a second shutter disposed after the last lens group of the afocal zoom system wherein the second shutter has a variable diameter opening, the method comprising the steps of:

adjusting a magnification of the afocal zoom system;

varying the variable diameter opening of the second shutter opening to control a depth of focus of the object image at low to medium magnifications of the afocal zoom system; and varying the variable diameter opening of the first shutter opening to control the depth of focus of the object image at medium to high magnifications of the afocal zoom system.

8. The method according to claim 7, further comprising the steps of:

adjusting the magnification of the afocal zoom system from a low magnification to a high magnification;

increasing the diameter of the second shutter opening during the adjustment of the afocal zoom system from low to high magnification such that a brightness of the object image remains substantially constant; and decreasing the diameter of the first shutter opening such that the depth of focus of the object image remains substantially constant.

\* \* \* \* \*